United States Patent [19]

Kuzma

[11] 3,864,292

[45] Feb. 4, 1975

[54] BAKED ALKYD RESIN ENAMEL COATING COMPOSITIONS CROSS-LINKED WITH ETHERIFIED TRIMETHYLOLATED CROTONYLIDENEDIUREA OR ETHERIFIED METHYLOLATED 2,7-DIXO-4, 5 -DIMETHYL- DECAHYDROPYRIMIDO-(4, 5-D) -PYRIMIDINE

[75] Inventor: Edward J. Kuzma, Woodbridge, N.J.

[73] Assignee: Celanese Corporation, New York, N.Y.

[22] Filed: Feb. 4, 1974

[21] Appl. No.: 439,467

Related U.S. Application Data

[63] Continuation of Ser. No. 144,270, May 17, 1971, Pat. No. 3,808,039.

[52] U.S. Cl............. 260/21, 117/62.2, 117/132 B, 117/161 K, 260/850
[51] Int. Cl....... C08g 9/24, C08g 37/34, C09d 3/64
[58] Field of Search........... 117/161 K, 62.2, 132 B; 260/21, 850, 67.5; 1/67.6 R

[56] References Cited
UNITED STATES PATENTS

| 3,016,555 | 1/1962 | Penoyer | 117/161 |
| 3,063,870 | 11/1962 | Wakeman | 117/161 |
| 3,160,618 | 12/1964 | Delacretaz | 117/161 |
| 3,231,374 | 1/1966 | Sciambi | 117/62.2 |
| 3,309,327 | 3/1967 | Gayer | 260/850 |
| 3,654,193 | 4/1972 | Seiner | 117/161 |
| 3,753,648 | 8/1973 | Powanda | 8/115.7 |
| 3,755,228 | 8/1973 | Levine | 260/29.4 UA |
| 3,764,263 | 10/1973 | Powanda | 8/115.7 |
| 3,808,039 | 4/1974 | Kuzma | 117/161 K |

Primary Examiner—Mayer Weinblatt
Assistant Examiner—Dennis L. Albrecht
Attorney, Agent, or Firm—John A. Shedden; Kenneth A. Genoni; Thomas J. Morgan

[57] ABSTRACT

Amyl acid phosphate, when employed as a catalyst for heat-curing alkyd resin coating compositions cross-linked with etherified trimethylolated crotonylidenediurea or etherified methylolated 2,7-dioxo-4,5-dimethyl-decahydropyrimido-[3,4-d]-pyrimidine, provides enamels of improved whiteness and color stability. The use of amyl acid phosphate in conjunction with urea as a catalyst system for heat-curing the aforementioned resins is also disclosed.

1 Claim, No Drawings

BAKED ALKYD RESIN ENAMEL COATING COMPOSITIONS CROSS-LINKED WITH ETHERIFIED TRIMETHYLOLATED CROTONYLIDENEDIUREA OR ETHERIFIED METHYLOLATED 2,7-DIXO-4,5-DIMETHYL-DECAHYDROPYRIMIDO-(4,5-D)-PYRIMIDINE

This is a continuation of application Ser. No. 144,270, filed May 17, 1971 now U.S. Pat. No. 3,808,039.

BACKGROUND OF THE INVENTION

This invention relates to the production of baked enamels. More particularly, it relates to a catalyst system for curing alkyd enamel resins to produce coatings having a high degree of whiteness.

Alkyd resin enamels useful for coating kitchen appliances, washing machines, automobiles, and the like, must meet very rigorous specifications in view of their exposure to weather and various chemicals, including detergents, caustics, acids, alcohols, and staining agents. These enamels must also exhibit satisfactory gloss, hardness, impact resistance, curing rates, and the like. Furthermore, in addition to the aforementioned properties, an enamel for use in coating kitchen and laundry appliances (e.g., stoves, refrigerators, washing machines, and the like) must be capable of exhibiting good whiteness. While satisfactory whiteness is known to be attainable by the incorporation of appropriate "whiteners" into the coating formulation, it would be more desirable to achieve superior whiteness as an inherent property of the coating itself, rather than have to resort to the expedient of adding extraneous agents to achieve this goal.

A baked enamel presently enjoying substantial commercial success is prepared from alkyd resins containing aminoplasts of the urea-formaldehyde and melamine-formaldehyde type, including the butylated derivatives thereof. The alkyd resin components are generally oil-modified polyester reaction products of polybasic acids, e.g., a phthalic acid or its anhydride, and a polyol, e.g., a triol such as glycerol. Optionally, a minor proportion of a monobasic acid or a dibasic acid, such as benzoic acid substitued benzoic acid, adipic acid, or the like, can be present.

Of the condensation products of amines or amides, such as triazines, diazines, triazoles, guanidines, guanamines, and the like, with aldehydes, such as formaldehyde and acetaldehyde, the melamine-formaldehyde resins have, in general provided that most desirable overall enamel properties an aminoplast components of alkyd resins. Urea-formaldehyde resins have been quite successful, also, not so much because of their overall effectiveness, particularly when compared with melamine-formaldehyde resins, but because urea-formaldehyde resins are considerably less expensive. Obviously, there is a need for a process for producing a coating composition utilizing an aminoplast-type crosslinking agent of the caliber of a melaminealdehyde aminoplast, yet without the cost handicap and which process is inherently capable of producing coatings having excellent whiteness.

Therefore, it is an object of the present invention to provide a means for producing a baked enamels having good resistance to weathering and to various chemicals including detergents, caustics, acids, alcohols, and staining agents.

Another object is to provide a means for producing baked enamels having the cost advantages presently enjoyed by the urea/aldehyde-containing coating resins.

Yet another object is to provide a means for producing baked enamels which is inherently capable of producing such coatings in a form having excellent whiteness.

These and other objects of the present invention, as well as a fuller understanding of the advantages thereof, can be had by reference to the following detailed description and claims.

SUMMARY OF THE INVENTION

The above objects are achieved according to the present invention by the discovery that amyl acid phosphate, when used as the catalyst for the heat curing of specific and novel baking enamels, provides coatings which, in addition to meeting the usual requirements of resistance to weathering and various chemicals, satisfactory gloss, hardness, impact resistance, curing rates, and the like, also exhibit unusually good whiteness as compared to the whiteness of conventional resins cured with catalysts heretofore employed in the prior art. The term "amyl acid phosphate" refers to mono-amyl phosphate, di-amyl phosphate, and mixtures thereof, which are represented collectively by the following formula:

wherein R is a hydrogen substituent or an n-amyl substituent (i.e., $-CH_2CH_2CH_2CH_2CH_3$), subject to the proviso that at least one of the R groups is an n-amyl substituent. Amyl acid phosphate is conveniently available from Hooker Chemical Corporation, Niagra Falls, New York. This material, which is a mixture of mono- and di-amyl phosphate, is a colorless-to-light yellow liquid.

It is a feature of the present invention that amyl acid phosphate can be advantageously utilized as a catalyst for the heat-curing of certain novel alkyd coatings resins containing, as cross-linking agents, novel aminoplast compounds having either of the following general formulae:

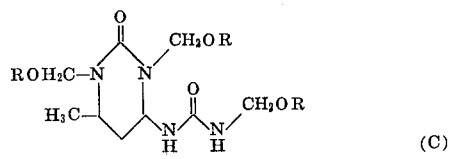

Etherified trimethylolated crotonylidenediurea

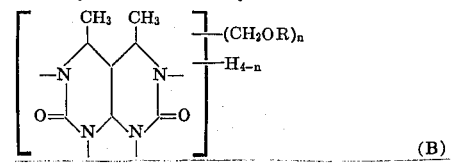

Etherified methylolated 2,7-dioxo-4,5-dimethyl-decahydropyrimido-[4,5-d]-pyrimidine wherein n is an integer from 1 to 4 and R is a hydrogen substituent or the alkyl residue of a monohydric alcohol, subject to the proviso that at least one of the R groups is said alkyl residue in each of formulae (C) and (B).

Compounds of formula (C) are disclosed in copending and commonly assigned U.S. application Ser. No. 135,749 filed Apr. 20, 1971, now abandoned by Alan L. Peterkofsky, James E. Tracy, and Paul M. Schumacher and entitled "Etherified Trimethylolated Crotonylidenediurea and its Use in Alkyd Resin Coating Compositions".

Compounds of formula (B) are disclosed in compending and commonly assigned U.S. application Ser. No. 135,747 filed Apr. 20, 1971 by James E. Tracy, Paul M. Schumacher, and Alan L. Peterkofsky and entitled "Aminoplast Material and Use Thereof in Alkyd Resin Coating Compositions".

Compounds having the formula (B) and (C) constitute two novel classes of materials having unusual "aminoplastic properties", so to speak, in enamels of the alkyd resin type, particularly with respect to hardness, chemical resistance, curing rates, and other like properties. Not only are these compounds generally superior to the urea-aldehyde aminoplasts but they are comparable and superior, in significant respects, to the relatively expensive melamine-aldehyde type resins.

Furthermore, by utilizing amyl acid phosphate as a catalyst in the curing of coating resins containing the aforementioned novel cross-linking agents, extraordinary whiteness is achieved. This feature of the present invention is especially advantageous in coating applications where whiteness is desired, e.g., in enamel coatings for kitchen and laundry applications.

In forming baked enamel coatings according to the process of the present invention, an alkyd resin coating composition is heat cured in admixture with a quantity of either or both of the aforementioned aminoplast compounds (B) and (C). The curing is faciliated by the incorporation into the reaction mixture of a catalytically effective amount of amyl acid phosphate (A). Desirably, the alkyd resin coating composition component is present in a concentration of between about 40 and about 95 percent by weight, based on the total weight of the alkyd resin and aminoplast. The aminoplast, accordingly, would be present in amounts of between about 5 and about 60 percent on the same weight basis. The catalyst amyl acid phosphate is desirably present in amounts of between about 0.05 and about 2 percent by weight, based on the total weight of the baked enamel coating composition. Quantities of catalyst less than about 0.05 percent tend to be ineffective, whereas amounts much in excess of 2 percent tend to discolor the final coating and diminish the hardness thereof. Preferably, the alkyd resin component is present in a concentration of between about 55 and about 93 percent by weight, while the amyl acid phosphate is preferably employed in amounts of between about 0.1 and about 1 percent by weight. Curing temperatures employed in the present process are generally those conventionally used in the baked enamel art. The choice of a particular temperature will usually be determined by such factors as desired curing rates, degree of cure (cross-linking), and the like. Generally, such curing temperatures will lie somewhere between about 200°F. and about 400°F., and preferably between about 250°F. and about 300°F.

In a preferred mode according to the present invention one part by weight of a 20 percent by weight solution of amyl acid phosphate in methanol is added to 100 parts by weight of an alkyd resin/aminoplast paint formulation. The paint is then sprayed on the surface to be coated, air dried for 10 to 15 minutes, and finally baked at elevated temperature. It is a further feature of the present invention that, when a small quantity urea say, about 5 parts of 10 weight percent methanolic urea are added to the above paint formulation, increased hardness and extremely white coatings are obtained. For some unknown reason, the incorporation of urea in amounts greater than that mentioned above (i.e., about 0.5 percent by weight of the enamel coating composition), does not enhance the hardness or whiteness beyond that already indicated. Desirably urea in an amount of at least 0.1 percent and preferably about 0.2 to about 0.7 percent by weight is employed.

DESCRIPTION OF THE PREFERRED EMBODIMENTS

The following examples are presented for the purpose of illustrating present invention. In the examples, parts and percentages are by weight unless otherwise indicated. It should be clearly understood that the examples give generally preferred embodiments which are not intended to unduly limit the scope of the present invention; in other words, it will be apparent to the person skilled in the art that numerous modifications, extensions and variations are clearly within the spirit and scope of the invention.

EXAMPLE I

Preparation of Methylolated Crotonylidenediurea

To a suitable reaction vessel equipped with conventional agitation means are charged 239 grams (2.94 moles) of 37 percent formalin ("uninhibited") and 15 grams of a 10 percent aqueous solution of sodium carbonate. To the resulting mixture are added, with agitation, 172 grams (1.0 mole) of crystalline crotonylinediurea. The reaction mixture, which has a pH of between about 9 and about 9.5, is heated to reflux temperature over the course of about 20 minutes and maintained at the reflux temperature for about 5 minutes. The reaction mixture is then cooled to ambient temperature, the pH is adjusted to 7.0, and the reaction mixture filtered to remove insolubles. The clear filtrate contains 2.8 percent free formaldehyde as determined by the "sodium sulfite method" described in Walker, Formaldehyde, 3d ed, p. 486 (Reinhold, N.Y. 1964). The concentration of aminoplast material in the aqueous filtrate is 60 percent by weight as determined gravimetrically, i.e., by evaporating an aliquot sample of the solution at 70°C for 6 hours and weighing the residue. The aminoplast is methylolated crotonylidenediurea (C).

EXAMPLE II

This example illustrates a variant of the procedure used in Example I to produce the methylolated crotonylidenediurea:

To a suitable reaction vessel equipped with conventional agitation means are charged 4055 grams (50 moles) of 37 percent formalin ("uninhibited") and 150 grams of a 10 percent aqueous solution of sodium carbonate. To the resulting mixture is added, with agitation, 1720 grams (10 moles) of crystalline crotonylidenediurea. The reaction mixture having a pH of between about 9 and about 9.5, is then heated at reflux temperature for 5 minutes and cooled to ambient temperature. An additional charge of 150 grams of 10 percent aqueous sodium carbonate and 1204 grams (7 moles) of crotonylidenediurea are added and the reaction mixture is again heated to reflux temperature and maintained thereat for 30 minutes. Upon re-cooling the reaction mixture to ambient temperature, neutralizing the pH, and filtering, a solution of methylola crotonylidenediurea is obtained which contains 2.7 percent unreacted formaldehyde.

EXAMPLE III

Preparation of Butoxymethylated Crotonylidenediurea

The clear filtrate of Example I is charge to a reaction vessel equipped with a phase separation head, and the pH is adjusted to a value of 3.0 by the addition of 25% aqueous formic acid. An amount (370 parts) of butanol is added to the reaction vessel and the system is heated to reflux temperature (about 100°C) and azeotropic distillation of water from the reaction mixture is continued until the temperature of the resin system reaches 117°C. The system is then cooled to ambient temperature and the product, butylated methylolated crotonylidenediurea adjusted to a solids content of 50%.

EXAMPLE IV

Preparation of Cyclohexyloxymethylated Crotonylidenediurea

The clear filtrate of Example I, above, is charged to a reaction vessel equipped with a phase separation head, and the pH is adjusted to a value of 3.0 by the addition of 25% aqueous formic acid. An amount (5000 grams; 50 moles) of cyclohexanol is added to the reaction vessel and the system heated to reflux temperature and azeotropic distillation of water from the reaction mixture in continued until the temperature reaches about 130°C. To guard against product resin decomposition or polymerization, azeotropic distillation during the final stages is carried out under vacuum. The system is then cooled to ambient temperature and the product, cyclohexylated trimethylol crotonylidenediurea, adjusted to the desired solids content.

EXAMPLE V

Preparation of Methoxymethylated Crotonylidenediurea

This example illustrates a variant of the procedure used in Examples III and IV to produce an alkylated (i.e., methylated methylolated crotonylidenediurea.

An amount (272.0 parts) of 55% methyl Formcel containing 149.6 parts of formaldehyde (55% by weight), 95.2 parts of methanol (35% by weight) and 10% water is charged to a reaction vessel, and the pH is adjusted to a value of 3.0 by the addition of sufficient 25% aqueous formic acid. To the reaction vessel is then added 172.0 parts of crotonylidenediurea. The system is heated to reflux temperature (about 96°C) and maintained thereat for approximately 1 hour. At the end of this period, the temperature of the reaction mixture is reduced to approximately 55°C, followed by the addition of 262.0 parts of methanol. This temperature is maintained for a period of about 2 hours, during which time the pH is kept constant at 3.0 by the addition of appropiate quantities of 25% formic acid. At the end of the two-hour holding period, the reaction system is cooled to ambient temperature and the pH adjusted to 7.8 with 10 N sodium hydroxide. The reaction mixture is then filtered and evaporated under reduced pressure to remove excess methanol and water of reaction. The resulting residue of methylated trimethylol crotonylidenediurea is re-dissolved in sufficient isopropanol to produce a solution containing 50% solids.

EXAMPLE VI

Preparation of Butoxymethylated Crotonylidenediurea

Butyl Formcel (206.0 parts) containing 82.4 parts of formaldehyde (40% by weight) and 109.2 parts of butanol (53% by weight) and n-butanol (62.0 parts) are charged to a reaction vessel equipped with a phase separation head, and the pH is adjusted to 2.3 by the addition of 25% aqueous formic acid. An amount (86.0 parts) of crotonylidenediurea is added to the reaction vessel and the system is heated to reflux temperature (about 100°C) and azeotropic distillation of water from the reaction mixture is continued until the temperature of the resin system reaches 117°C. The system is then cooled to ambient temperature and the product butylated methylolated crotonylidenediurea adjusted to a solids content of 50% by the addition of butanol.

EXAMPLE VII

Preparation of Benzyloxymethylated Crotonylidenediurea

Example V is repeated in every essential respect with the exception that methyl Formcel is replaced by a mixture of 405 parts of 37% formalin (uninhibited) and 688 parts of benzyl alcohol. The system is likewise heated to atmospheric reflux temperature for one hour and then cooled to approximately 55°C by the addition of another 500 parts of benzyl alcohol. Subsequent to this step Example V is followed in every essential detail and benzylated methylolated crotonylidenediurea thus produced.

EXAMPLE VIII

Preparation of Butoxymethylated Crotonylidendiurea

Crotonylidenediurea (344.0 grams), 92% flake paraformaldehyde (196.0 grams, containing 180 grams of formaldehyde and 16 grams of water), n-butanol (518.0 grams), and 10% aqueous sodium carbonate solution (30 grams) are charged to a reaction vessel equipped with a phase separation head. The mixture is heated to reflux (about 101°-103°C) and held thereat for 75 minutes. The pH at the end of this reflux is 7.2. Aqueous formic acid, 88% (5.0 grams), is then added to lower the pH to 5.3, and water is removed from the reaction mixture by azeotropic distillation until the temperature of the resin system reaches 117°C. After cooling to ambient temperature, the reaction mixture is filtered to give a clear solution of the product, butylated methylolated crotonylidenediurea.

EXAMPLE IX

Preparation of Methoxymethylated Crotonylidendiurea

Crotonylidenediurea (344.0 grams), 92% flake paraformaldehyde (329.8 grams, containing 303.4 grams of formaldehyde and 26.4 grams of water), water (34.3 grams), and methanol (287.5 grams) are charged to a reactor and heated to reflux (about 94°C). After refluxing for 45 minutes, the pH is 5.4. Aqueous formic acid, 88% is added to lower the pH to 3.1. Refluxing is continued for an additional 20 minutes, then the mixture is cooled to 55°C and additional methanol (416.5 grams) is added. The mixture is maintained at 55°C for 4 hours, cooled to ambient temperature, and filtered to give a clear solution of the product, methylated methylolated crotonylidenediurea.

EXAMPLE X

Preparation of Methylolated 2,7-Dioxo-4,5-Dimethyl-Decahydropyrimido-[4,5-d]-Pyrimidine To a suitable reaction vessel equipped with conventional agitation means are charged 239 grams (2.94 moles) of 37 percent formalin (uninhibited) and 15 grams of a 10 percent aqueous solution of sodium carbonate. To the resulting mixture is added, with agitation, 198 grams (1.0 mole) of crystalline 2,7-dioxo-4,5-dimethyl-decahydropyrimido-[4,5-d]-pyrimidine. The reaction mixture is then cooled to ambient temperature, the pH is adjusted to 7.0, and the reaction mixture filtered to remove insolubles. The clear filtrate contains 2.5 percent free formaldehyde as determined by the "sodium sulfite method+ described in Walker, Formaldehyde, 3d ed., p. 486 (Reinhold, N.Y. 1964). The concentration of aminoplast material in the aqueous filtrate is 60 percent by weight as determined gravimetrically, i.e., by evaporating an aliquot sample of the solution at 70°C for 6 hours and weighting the residue. The product, of course, is aminoplast material (B).

EXAMPLE XI

This example illustrates a variant of the procedure used in Example X to produce the methylolated material (B).

To a suitable reaction vessel equipped with conventional agitation means are charged 2919 grams (36 moles) of 37 percent formalin (uninhibited) and 135 grams of a 10 percent aqueous solution of sodium carbonate. To the resulting mixture is added, with agitation, 1982 grams (9 moles) of crystalline 2,7-dioxo-4,5-dimethyl-decahydropyrimido-[4,5-d]-pyrimidine. The reaction mixture, having a pH of between about 9 and about 9.5, is then heated at reflux temperature for 5 minutes and cooled to 55°C. An additional charge of 135 grams of 10 percent aqueous sodium carbonate and 990 grams (5 moles) 2,7-dioxo-4,5-dimethyl-decahydropyrimidio-[4,5-d]-pyrimidine are added and the reaction mixture is again heated to reflux temperature and maintained thereat for 30 minutes. Upon re-cooling the reaction mixture to ambient temperature, neutralizing the pH, and filtering, a solution of methylolated 2,7-dioxo-4,5-dimethyl-decahydropyrimido-[4,5-d]-pyrimidine is obtained which contains 2.0 percent unreacted formaldehyde.

EXAMPLE XII

Preparation of Butoxymethylated 2,7-Dioxo-4,5-Dimethyl-Decahyropyrimido-[4,5-d]-Pyrimidine The clear filtrate of Example X is charged to a reaction vessel equipped with a phase separation head, and the pH is adjusted to a value of 3.0 by the addition of 25 percent aqueous formic acid. An amount (370 parts) of butanol is added to the reaction vessel and the system is heated to reflux temperature (about 100°C) and azeotropic distillation of water from the reaction mixture is contined until the temperature of the resin system reaches 117°C. The system is then cooled to ambient temperature and the product, butoxymethylated 2,7-dioxo-4,5-dimethyl-decahydropyrimido-[4,5-d]-pyrimidine is adjusted to a solids content of 50 percent.

EXAMPLE XIII

Preparation of Cyclohexyloxymethylated 2,7-Dioxo-4,5-Dimethyl-Decahydropyrimido-[4,5-d]-Pyrimidine The clear filtrate of Example XI, above, is charged to a reaction vessel equipped with a phase separation head, and the pH is adjusted to a value of 3.0 by the addition of 25% percent aqueous formic acid. An amount (5000 grams; 50 moles) of cyclohexanol is added to the reaction vessel and the system heated to reflux temperature and azeotropic distillation of water from the reaction mixture is continued until the temperature reaches about 130°C. To guard against product resin decomposition or polymerization, azeotropic distillation during the final stages is carried out under vacuum. The system is then cooled to ambient temperature and the product, cyclohexyloxymethylated 2,7-dioxo-4,5-dimethyl-decahydropyrimido-[4,5-d]-pyrimidine adjusted to the desired solids content.

EXAMPLE XIV

Preparation of Methoxymethylated 2,7-Dioxo-4,5-Dimethyl-Decahydropyrimido-[4,5d]-Pyrimidine This example illustrates a variant of the procedure used in Examples XII and XIII to produce an alkylated (i.e., methylated) methylolated 2,7-dimethyl-decahydropyrimido-[4,5-d]-pyrimidine.

An amount (272.0 parts) of 55 percent methyl Formcel containing 149.6 parts of formaldehyde (55 percent by weight), 95.2 parts of methanol (35 percent by weight) and 10 percent water is charged to a reaction vessel, and the pH is adjusted to a value of 3.0 by the addition of an appropriate amount of 25 percent aqueous formic acid. To the reaction vessel is then added 198.0 parts of 2,7-dioxo-4,5-dimethyl-decahydropyrimido-[4,5-d]-pyrimidine. The system is heated to reflux temperature (about 96°) and maintained thereat for approximately 1 hour. At the end of this period, the temperature of the reaction mixture is reduced to approximately 55°C., followed by the addition of 262.0 parts of methanol. This temperature is maintained for a period of about 2 hours, during which time the pH is kept constant at 3.0 by the addition of appropriate quantities of 25 percent formic acid. At the end of the 2 hour holding period, the reaction system is cooled to ambient temperature and the pH adjusted to 7.8 with 10 N sodium hydroxide. The reaction mixture is then filtered and evaporated under reduced pressure to remove water and excess methanol. The resulting residue of methoxymethylated 2,7-dioxo-4,5-dimethyl-decahydropyrimido-[4,5-d]-pyrimidine is redissolved in sufficient isopropanol to produce a solution containing 50 percent solids.

EXAMPLE XV

Preparation of Butoxymethylated 2,7-Dioxo-4,5-Dimethyl-Decahydropyrimido-[4,5-d]-Pyrimidine Butyl Formcel (206.0 parts) containing 82.4 parts of formaldehyde (40 percent by weight) and 109.2 parts of butanol (53 percent by weight) and n-butanol (62.0 parts) are charged to a reaction vessel equipped with a phase separation head, and the pH is adjusted to 2.3 by the addition of 25 percent aqueous formic acid. An amount (99.0 parts) of 2,7-dioxo-4,5-dimethyl-decahydropyrimido-[4,5-d]-pyrimidine is added to the reaction vessel and the system is heated to reflux temperature (about 100°C) and azeotropic distillation of water from the reaction mixture is continued until the temperature of the resin system reaches 117°C. The system is then cooled to ambient temperature and the product butoxymethylated 2,7-dioxo-4,5-dimethyl-decahydropyrimido-[4,5-d]-pyrimidine adjusted to a solids content of 50 percent by the addition of butanol.

EXAMPLE XVI

Preparation of Benzyloxymethylated 2,7-Dioxo-4,5-Dimethyl-Decahydropyrimido-8 4,5-d]-Pyrimidine Example XIV is repeated in every essential respect with the exception that methyl Formcel is replaced by a mixture of 405 parts of 37 percent formalin (uninhibited) and 688 parts of benzyl alcohol. The system is likewise heated to atmospheric reflux temperature for one hour and then cooled to approximately 55°C. by the addition of another 500 parts of benzyl alcohol. Subsequent to this step Example V is followed in every essential detail; benzyloxymethylated 2,7-dioxo-4,5-dimethyl-dedahydropyrimid [4,5-d]-pyrimidine is thus produced.

EXAMPLE XVII

Preparation of Butoxymethylated 2,7-Dioxo-4,5-Dimethyl-Decahydropyrimido-[4,5-d]-Pyrimidine A quantity (396.0 grams) of 2,7-dioxo-4,5-dimethyl-decahydropyrimido-[4,5-d]-pyrimidine, 92 percent flake paraformaldehyde (196.0 grams; contains 180 grams of formaldehyde and 16 grams of water), n-butanol (518.0 grams) and 10 percent aqueous sodium carbonate solution (30 grams) are charged to a reaction vessel equipped with a phase separation head. The mixture is heated to reflux (about 101°–103°C) and held thereat for 75 minutes. The pH at the end of this reflux period is 7.2. Aqueous (88percent) formic acid (5.0 grams), is then added to lower the pH to 5.3, and water is removed from the reaction mixture by azeotropic distillation until the temperature of the resin system reaches 117°C. After cooling to ambient temperature, the reaction mixture is filtered to give a clear solution of the product, butoxymethylated 2,7-dioxo-3,4-dimethyl-decahydropyrimido-[4,5-d]-pyrimidine.

EXAMPLE XVIII

Preparation of Methoxymethylated 2,7-Dioxo-4,5-Dimethyl-Decahydropyrimido-[4,5-d]-Pyrimidine A quantity (396.0 grams) of 2,7-dioxo-4,5-dimethyl-decahydro-pyrimido-[4,5-d]-pyrimidine, 92 percent flake paraformaldehyde (329.8 grams; contains 303.4 grams of formaldehyde plus 26.4 grams of water), and methanol (287.5 grams) are charged to a reactor and heated to reflux (about 94°C). After refluxing for 45 minutes the pH is 5.4. Aqueous formic acid (88 percent) is added to lower the pH to 3.1. Refluxing is continued for an additional 20 minutes, the mixture is cooled to 55°C., and additional methanol (416.5 grams) is added. The mixture is maintained at 55°C. for 4 hours, cooled to ambient temperature, and filtered to give a clear solution of the product methoxymethylated 2,7-dioxo-3,4-dimethyl-decahydropyrimido-[4,5-d]-pyrimidine.

EXAMPLE XIX

The product of the above examples are tested in a typical white enamel alkyd resin for coating compositions, viz., Duraplex*ND-77B resin (Duraplex* is a trademark for a short oil coconut alkyd resin sold by Rohm and Haas).

Baking enamels are prepared at alkyd/aminoplast ratios of 90/10, 80/20 and 70/30 and are baked at 250°F on a conventional metal substrate, viz., Parker Test Panels, cold rolled steel, SPRA Bonderite 100 Treatment, 4×8"×24 GA. and Parker Test Panels, Aluminum 3003-H14, Bonderite 721 treatment, 4×8" (for flexibility tests). Purchased from Hooker Chemical Co., Parker Division, Detroit, Michigan. Paint films are obtained by spraying. The wet films are allowed to dry for about 10 to 15 minutes, and the oven cured at specified temperatures for specified times. Rate of cure is determined by plotting development of hardness (pencil test) vs. cure temperature and time. Gloss: Standard 60° gloss angle measurement determined on a Hunterlab Model D16 Glossmeter (Hunter Associates Laboratories, Inc., Fairfax, Va.) in accordance with ASTM D523.

The etherified methylolated crotonylidenediurea products of Examples V and VI, above, and the etherified methylolated 2,7-dioxo-4,5-dimethyl-decahydropyrimido products of Examples XIV and XV, above, are formulated into baking enamels (alkyd-/amine ratios of 90/10, 80/20 and 70/30) according to the conventional method and formulation shown in the following table I.

TABLE I

WHITE BAKING ENAMEL

| Roller Mill Grind | Pounds | Pounds | Pounds |
|---|---|---|---|
| Titanium Dioxide | 16.6 | 16.6 | 16.6 |
| Duraplex ND-77B (60% Solids) | 11.7 | 11.7 | 11.7 |
| Mix With | | | |
| Duraplex ND-77B (60% Solids) | 13.3 | 10.5 | 7.8 |
| Amino Resin (50% Solids) | 3.4 | 6.7 | 10.0 |
| Xylol | 8.6 | 8.1 | 7.5 |
| Catalyst Solution* | 0.6 | 0.5 | 0.5 |
| Physical Constants | | | |
| percent Solids | 62.1 | 62.1 | 62.1 |
| Pigment/Vehicle | 1/1 | 1/1 | 1/1 |
| Alkyd/Amino | 90/10 | 80/20 | 70/30 |

*Catalyst is 20% solution of amyl acid phosphate in methanol

Test panels prepared from these formulations exhibited the properties shown in Table II, below:

TABLE II

PROPERTIES OF ENAMEL PANELS (Oven Time = 30 Minutes)

| Aminoplast: | Temp. | Conc. (by weight) | Pencil Hardness | Reverse Impact (inch-lbs) | Conical Mandrel | 1% Tide* 50 Hours | 5% NaOH 5-24[1] | Merthiolate 1-24[2] |
|---|---|---|---|---|---|---|---|---|
| METHYLATED AMINOPLAST PREPARED IN EXAMPLE V | 250°F | 90/10 | 4 | 4-6 | — | 0 | 2-0 | **S-S |
| | | 80/20 | 6 | 2-4 | 0.38 | 0 | 2-2 | S-S |
| | | 70/30 | 6 | 2-4 | 0.88 | 0 | 2-2 | S-S |
| | 300°F | 90/10 | 4 | 6-8 | — | 0 | 2-0 | S-S |
| | | 80/20 | 6 | 2-4 | 0.13 | 0 | 2-2 | S-S |
| | | 70/30 | 7 | 2-4 | 1.10 | 0 | 2-2 | S-S |
| BUTYLATED AMINOPLAST PREPARED IN EXAMPLE VI | 250°F | 90/10 | 4 | 8-10 | — | 0 | 2-0 | S-S |
| | | 80/20 | 7 | 2-4 | 1.0 | 0 | 8-0 | ***NS-S |
| | | 70/30 | 7 | 2-4 | 1.25 | 0 | 10-4 | NS-S |
| | 300°F | 90/10 | 4 | 6-8 | — | 0 | 2-0 | S-S |
| | | 80/20 | 6 | 2-4 | 0.63 | 0 | 8-2 | NS-S |
| | | 70/30 | 7 | 2-4 | 1.88 | 0 | 10-2 | NS-S |
| METHYLATED AMINOPLAST PREPARED IN EXAMPLE XIV | 250°F | 90/10 | 4 | 4-6 | — | 0 | 2-0 | S-S |
| | | 80/20 | 6 | 2-4 | 0.38 | 0 | 2-2 | S-S |
| | | 70/30 | 6 | 2-4 | 0.88 | 0 | 2-2 | S-S |
| | 300°F | 90/10 | 4 | 6-8 | — | 0 | 2-0 | S-S |
| | | 80/20 | 6 | 2-4 | 0.13 | 0 | 2-2 | S-S |
| | | 70/30 | 7 | 2-4 | 1.10 | 0 | 2-2 | S-S |
| BUTYLATED AMINOPLAST PREPARED IN EXAMPLE XV | 250°F | 90/10 | 4 | 8-10 | — | 0 | 2-0 | S-S |
| | | 80/20 | 7 | 2-4 | 1.0 | 0 | 8-0 | NS-NS |
| | | 70/30 | 7 | 2-4 | 1.25 | 0 | 10-4 | NS-S |
| | 300°F | 90/10 | 4 | 6-8 | — | 0 | 2-0 | S-S |
| | | 80/20 | 6 | 2-4 | 0.63 | 0 | 8-2 | NS-S |
| | | 70/30 | 7 | 2-4 | 1.88 | 0 | 10-2 | NS-S |

Scale
HB-F = 4
F-H = 5
H-2H = 6
2H-3H = 7
3H-4H = 8

| Aminoplast: | Temp. | Conc. (by weight) | Ethanol 1-24[2] | Acetone 1-24[2] | 19% HCl 1-24[2] | 49% H$_2$SO$_4$ 1-24[2] | 100% HOAc 1-24[2] |
|---|---|---|---|---|---|---|---|
| METHYLATED AMINOPLAST PREPARED IN EXAMPLE V | 250°F | 90/10 | 2-0 | 2-2 | 2-0 | 2-2 | 6-0 |
| | | 80/20 | 2-2 | 6-6 | 2-0 | 2-2 | 10-0 |
| | | 70/30 | 8-8 | 2-2 | 2-0 | 4-2 | 0-0 |
| | 300°F | 90/10 | 2-2 | 2-0 | 2-0 | 4-2 | 6-0 |
| | | 80/20 | 2-2 | 2-0 | 2-0 | 4-2 | 6-0 |
| | | 70/30 | 8-8 | 8-8 | 2-0 | 2-2 | 6-0 |
| BUTYLATED AMINOPLAST PREPARED IN EXAMPLE VI | 250°F | 90/10 | 8-2 | 0-0 | 2-0 | 8-2 | 2-0 |
| | | 80/20 | 8-8 | 0-0 | 2-0 | 10-2 | 10-6 |
| | | 70/30 | 8-8 | 6-6 | 2-0 | 2-2 | 0-0 |
| | 300°F | 90/10 | 2-2 | 0-0 | 2-0 | 4-2 | 0-0 |
| | | 80/20 | 4-2 | 6-0 | 2-0 | 4-2 | 6-0 |
| | | 70/30 | 8-8 | 6-6 | 2-0 | 2-2 | 6-0 |
| METHYLATED AMINOPLAST PREPARED IN EXAMPLE XIV | 250°F | 90/10 | 2-0 | 2-2 | 2-0 | 2-2 | 6-0 |
| | | 80/20 | 2-2 | 6-6 | 2-0 | 2-2 | 10-0 |
| | | 70/80 | 8-8 | 2-2 | 2-0 | 4-2 | 0-0 |
| | 300°F | 90/10 | 2-2 | 2-0 | 2-0 | 4-2 | 6-0 |
| | | 80/20 | 2-2 | 2-0 | 2-0 | 2-2 | 6-0 |
| | | 70/30 | 8-8 | 8-8 | 2-0 | 2-2 | 6-0 |
| BUTYLATED AMINOPLAST PREPARED IN EXAMPLE XV | 250°F | 90/10 | 8-2 | 0-0 | 2-0 | 8-2 | 2-0 |
| | | 80/20 | 8-8 | 0-0 | 2-0 | 10-2 | 10-6 |
| | | 70/30 | 8-8 | 6-6 | 2-0 | 2-2 | 0-0 |
| | 300°F | 90/10 | 2-2 | 0-0 | 2-0 | 4-2 | 0-0 |
| | | 80/20 | 4-2 | 6-0 | 2-0 | 2-2 | 6-0 |
| | | 70/30 | 8-8 | 6-6 | 2-0 | 2-2 | 6-0 |

*Tide is a trademark for a detergent sold by Proctor & Gamble, Cincinnati, Ohio
Chemical Test 0 = denuded; 10 = unaffected
**S = Stain
***NS = No stain
[1] Recorded after 5 hours and after 24 hours
[2] Recorded after 1 hour and after 24 hours.

As is evident from Table I, above, the novel curing process of the present invention provides coatings which exhibit very desirable physical properties and chemical resistance. All test panels had commerically acceptable gloss.

The tests for physical and chemical properties reported in table I, above, are conventional.

Conical Mandrel - ASTM D 522
Reverse Impact - (Gardner Laboratories, Bethesda, Md.)
Pencil Hardness - 3B, 2B, B, HB, F, H, 2H, 3H, 4 H (increasing hardness)
1% Tide/50 hr. - ASTM D 2248
Stain and Chemical Resistance Tests - ASTM D 1308

While the tests carried out hereinabove use alkyd-/amino resin weight concentrations of 90/10, 80/20 and 70/30, based on the total weight of the alkyd and aminoplast components, these are merely illustrative. If desired, concentrations in the range of about 95/5 to about 40/60 may be used in preparing various coating compositions, depending upon the end use intended for these compositions. Generally, a concentration in the range of about 93/7 to about 55/45 is preferred.

EXAMPLE XX

The butoxymethylated crotonylidenediurea product of Example VI, above, is used to prepare various white baked enamels according to the procedure in Example XIX using different curing catalysts. The following Table III illustrates the results with respect to whiteness of the baked panels.

TABLE III

| Catalyst | Baked Color |
| --- | --- |
| benzene phosphinic acid | yellow |
| phosphoric acid | yellow |
| sulfuric acid | yellow |
| hydrochloric acid | yellow |
| para toluene sulfonic acid | yellow |
| methyl acid phosphate | slight yellow |
| butyl acid phosphate | very slight yellow |
| amyl acid phosphate | no discoloration |

I claim:

1. A coating composition adapted for producing baked enamel coatings comprising (1) between about 40 and about 95 per cent by weight of an alkyd resin coating composition; (2) between about 5 and about 60 per cent by weight of an aminoplast selected from the group consisting of etherified trimethylolated crotonylidenediurea and etherified methylolated 2,7-dioxo-4,5-dimethyl-decahydropyrimido-[4,5-d]-pyrimidine, the proportion of components (1) and (2) being based upon the total weight of the alkyd resin and aminoplast; and (3) a catalytically effective amount of amyl acid phosphate having the formula:

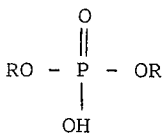

wherein R is a hydrogen substituent or an n-amyl substituent and at least one of said R substituents is n-amyl.